United States Patent
Mori (10) Patent No.: US 9,027,090 B2
(45) Date of Patent: May 5, 2015

(54) NETWORK SYSTEM AND INFORMATION PROCESSING METHOD

(71) Applicant: Shinya Mori, Tokyo (JP)

(72) Inventor: Shinya Mori, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 43 days.

(21) Appl. No.: 13/896,599

(22) Filed: May 17, 2013

(65) Prior Publication Data

US 2013/0347080 A1 Dec. 26, 2013

(30) Foreign Application Priority Data

Jun. 20, 2012 (JP) .................. 2012-139144

(51) Int. Cl.
H04L 29/06 (2006.01)

(52) U.S. Cl.
CPC ................ *H04L 63/10* (2013.01); *H04L 63/08* (2013.01)

(58) Field of Classification Search
CPC ....... H04L 63/08; H04L 63/10; H04L 63/102; G06F 21/6218; H04W 12/06

USPC ...................................... 726/4, 2, 3
See application file for complete search history.

(56) References Cited

U.S. PATENT DOCUMENTS

| | | |
|---|---|---|
| 7,000,230 B1 | 2/2006 | Murray et al. |
| 2005/0289535 A1 | 12/2005 | Murray et al. |
| 2012/0110058 A1* | 5/2012 | Kuroda .......................... 709/203 |

FOREIGN PATENT DOCUMENTS

| | | |
|---|---|---|
| JP | 2004-512578 | 4/2004 |
| JP | 2010-218468 | 9/2010 |

\* cited by examiner

*Primary Examiner* — Baotran N To
(74) *Attorney, Agent, or Firm* — Harness, Dickey & Pierce, P.L.C.

(57) ABSTRACT

A network system includes first information processing apparatus and a second information processing apparatus that are connected through a network. The first information processing apparatus includes a transmitter that transmits a setting for an application to the second information processing apparatus. The setting includes an attribute indicating whether any change in the setting in the second information processing apparatus is permitted. The second information processing apparatus includes a receiver that receives the setting; and a function executing unit that executes a function of the application in accordance with the setting.

10 Claims, 11 Drawing Sheets

| DISTRIBUTION INFORMATION | TRANSMISSION DESTINATION | NOTIFICATION OF COMPLETION | TRANSMISSION TIME |
|---|---|---|---|
| PLUG-IN A | USER'S PC 20-1 | RECEIVED | XX : YY |
| | USER'S PC 20-2 | NOT RECEIVED | |
| ⋮ | ⋮ | ⋮ | ⋮ |

DISTRIBUTION INFORMATION

| PLUG-IN MAIN BODY | SETTING |
|---|---|
| PLUG-IN A  V1.0 | SETTING A |
| PLUG-IN B  V1.1 | SETTING B |
| PLUG-IN C  V1.2 | SETTING C |
| PLUG-IN D | |

FIG.7

CONTENTS OF SETTINGS

| SETTING NAME | VALUE | SETTING CHANGE ACCESS RIGHT |
|---|---|---|
| COLOR/ MONOCHROME | MONOCHROME | ADMINISTRATOR |
| SINGLE SIDED/ DUPLEX | SINGLE SIDED | ADMINISTRATOR/ GENERAL USER |
| AGGREGATION | N/A | ADMINISTRATOR/ GENERAL USER |
| STAPLE | N/A | ADMINISTRATOR/ GENERAL USER |
| ⋮ | ⋮ | ⋮ |

NETWORK SYSTEM AND INFORMATION PROCESSING METHOD

CROSS-REFERENCE TO RELATED APPLICATIONS

The present application claims priority to and incorporates by reference the entire contents of Japanese Patent Application No. 2012-139144 filed in Japan on Jun. 20, 2012.

BACKGROUND OF THE INVENTION

1. Field of the Invention

The present invention relates to a network system and an information processing method.

2. Description of the Related Art

A general personal computer (PC) can achieve various functions through the installation of various types of software on its operating system (OS). When there is a printing apparatus or the like as peripheral equipment accessed by the PC, some software that uses and controls it is installed in the PC. The software can change functions depending on settings.

For example, Publication of Japanese Translation of PCT Application No. 2004-512578 discloses a method for distributing software through a network.

However, when settings of software are distributed from a server to a client through a network, if the client is allowed to freely change the settings of the software, the administrator cannot restrict the function of the software at the client.

Therefore, there is a need for a network system and an information processing method that are capable of allowing the administrator of software to restrict any change in the settings of the software that is distributed through a network.

SUMMARY OF THE INVENTION

According to an embodiment, there is provided a network system includes first information processing apparatus and a second information processing apparatus that are connected through a network. The first information processing apparatus includes a transmitter that transmits a setting for an application to the second information processing apparatus. The setting includes an attribute indicating whether any change in the setting in the second information processing apparatus is permitted. The second information processing apparatus includes a receiver that receives the setting; and a function executing unit that executes a function of the application in accordance with the setting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments will be described in detail with reference to the accompanying drawings.

Figure 1:
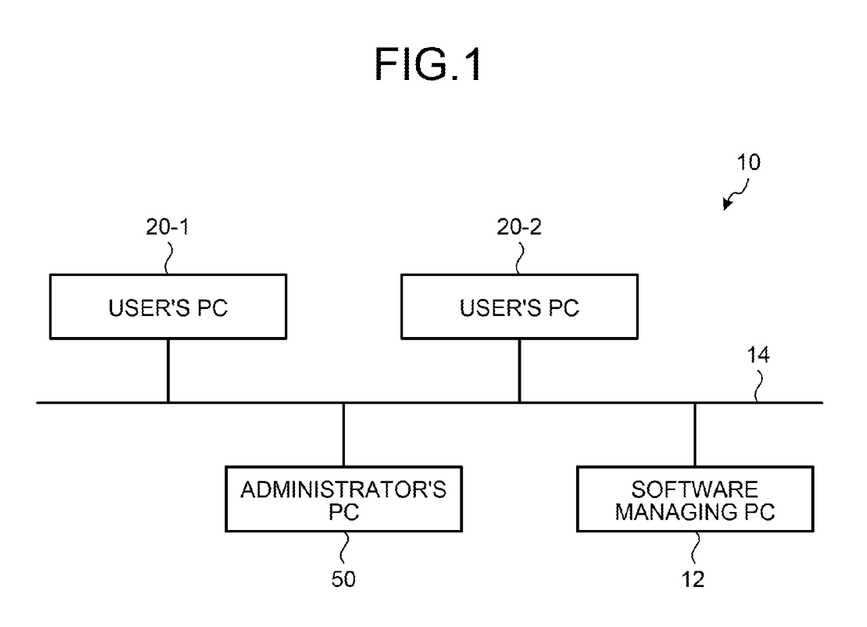
FIG. 1 is a configuration diagram illustrating a configuration example of a network system according to an embodiment.

FIG. 1 is a configuration diagram illustrating a configuration example of a network system 10 according to an embodiment. As illustrated in FIG. 1, the network system 10 is a client-server system in which, for example, user's personal computers (PCs) 20-1 and 20-2, an administrator's PC 50, and a software managing PC (server) 12 are connected through a network 14. The user's PCs 20-1 and 20-2, the administrator's PC 50, and the software managing PC 12 are all computers that operate by executing computer programs. The software managing PC 12 stores therein software (plug-in main body) to be distributed to the user's PCs 20-1 and 20-2. The administrator's PC 50 and the software managing PC 12 may be integrally configured.

Next, the user's PCs 20-1 and 20-2 and the administrator's PC 50 will be described in detail. When neither of a plurality of components such as the user's PCs 20-1 and 20-2 needs to be specified, they may be simply referred to as the user's PC 20, for example.

Figure 2:
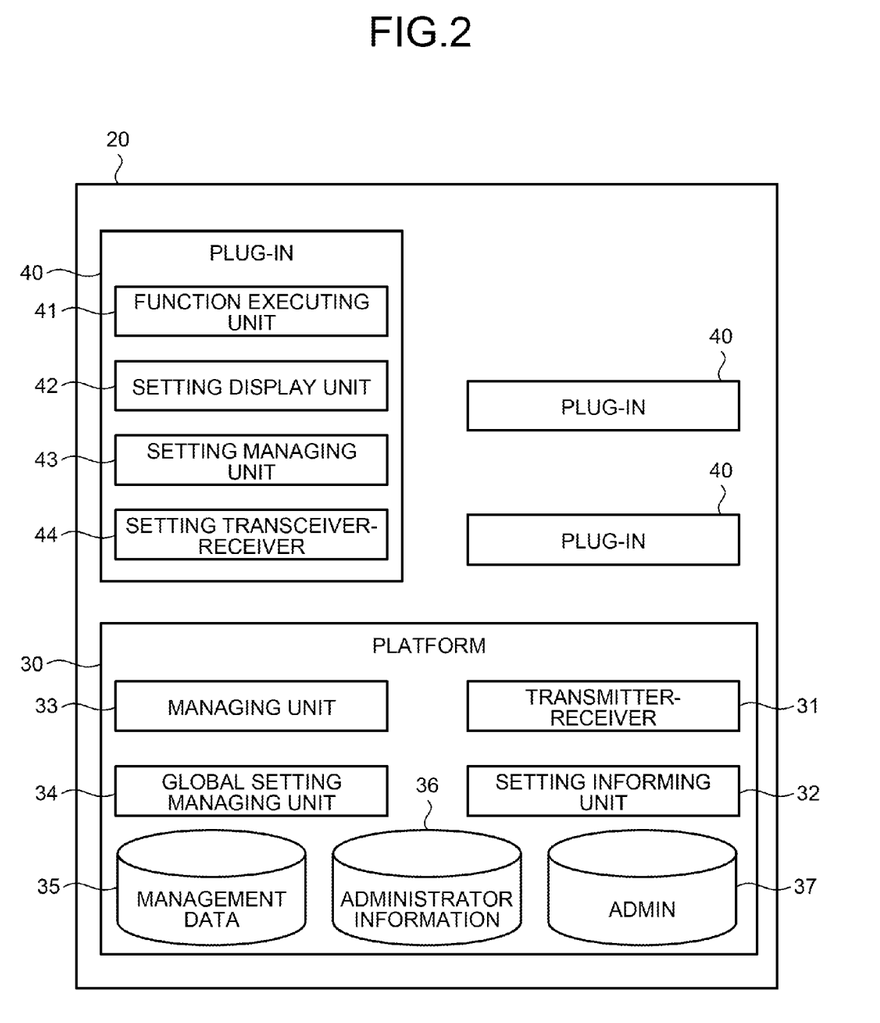
FIG. 2 is a functional block diagram illustrating the outline of functions that a user's PC has.

FIG. 2 is a functional block diagram illustrating the outline of functions that the user's PC 20 has. As illustrated in FIG. 2, the user's PC 20 includes a platform 30 and a plurality of plug-ins (applications) 40 that operate on the platform 30.

The platform 30 includes a transmitter-receiver 31, a setting informing unit 32, a managing unit 33, a global setting managing unit 34, management data 35, administrator information 36, and Admin (an authority information storage unit) 37.

The transmitter-receiver 31 includes a transmitter and a receiver and performs communications of data such as programs and settings through the network 14. The setting informing unit 32 transmits a notification to be described later to the administrator's PC 50. The managing unit 33 manages data in the platform 30. The global setting managing unit 34 manages settings (global settings) corresponding to any function that takes precedence over functions corresponding to the settings of the plug-ins 40, which will be described later. The management data 35 is a database for use in the management of the plug-ins 40. The administrator information 36 stores therein administrator information that identifies an administrator as the distribution source of distribution information that will be described later using FIG. 6. The Admin 37 is an authority information storage unit that stores therein authority information indicating administrator authority for each user's PC 20.

Each of the plug-ins 40 includes a function executing unit 41, a setting display unit 42, a setting managing unit 43, and a setting transceiver-receiver 44. The function executing unit 41 executes functions that the plug-in has. The setting display unit 42 has a function of displaying the settings of the plug-in. The setting managing unit 43 manages the settings of the plug-in. The setting transceiver-receiver 44 transmits and receives a setting for the plug-in.

Figure 3:
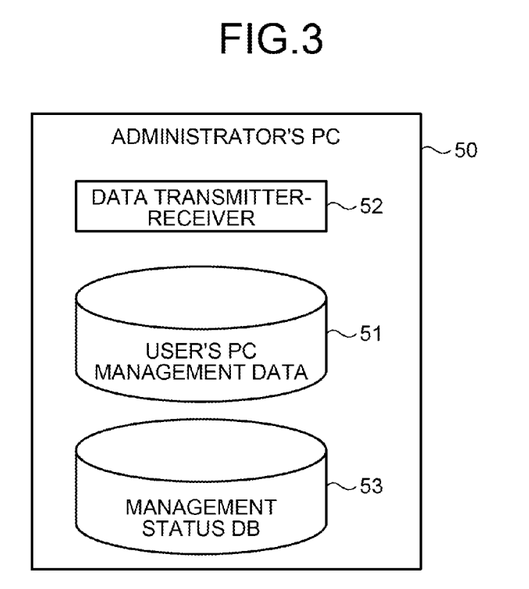
FIG. 3 is a functional block diagram illustrating the outline of functions that an administrator's PC has.

FIG. 3 is a functional block diagram illustrating the outline of functions that the administrator's PC 50 has. As illustrated in FIG. 3, the administrator's PC 50 includes user's PC management data 51, a data transmitter-receiver 52, and a management status database (DB) 53. The user's PC management data 51 is management data for managing clients such as the user's PCs 20-1 and 20-2. The management data managed by the user's PC management data 51 includes the IP addresses of the user's PCs 20-1 and 20-2 and data showing their installed plug-ins. The data transmitter-receiver 52 includes a transceiver and a receiver and performs transmission of distribution information that will be described later or the like. The management status DB 53 is a storage unit that stores therein a management status, which will be described later using FIG. 4.

Figure 4:
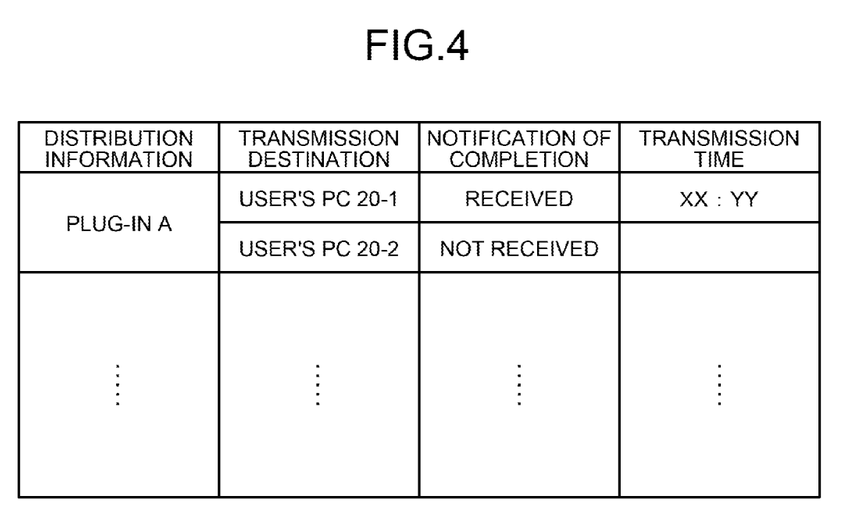
FIG. 4 is a table illustrating the configuration of a management status stored in a management status DB.

FIG. 4 is a table illustrating the configuration of a management status stored in the management status DB 53. As illustrated in FIG. 4, the management status includes, for each distribution information, the transmission destination of the distribution information, the status of reception of a notification indicating whether the installation of software corresponding to the distribution information has been completed, a transmission time at which the received notification was transmitted, or the like.

Figure 5:
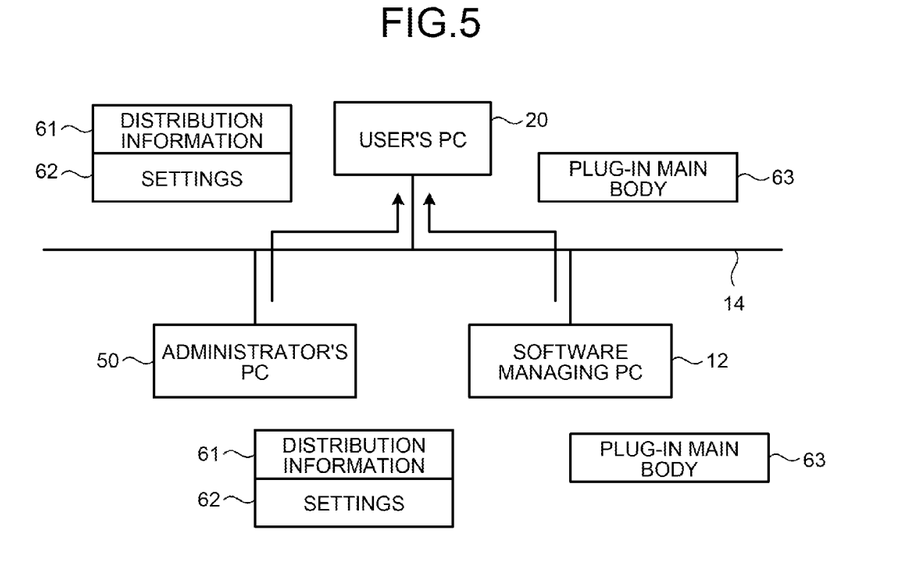
FIG. 5 is a diagram illustrating the outline of the operation of the network system.

Next, the outline of the operation of the network system 10 will be described. FIG. 5 is a diagram illustrating the outline of the operation of the network system 10. As illustrated in FIG. 5, the administrator's PC 50 transmits distribution information 61 to the user's PC 20 through the network 14. The distribution information 61 includes settings 62 (to be described later using FIG. 7 and the like). The software managing PC 12 transmits a plug-in main body 63 to the user's PC 20 through the network 14, for example, in response to a request from the user's PC 20. The software managing PC 12 may transmit the plug-in main body 63 to the user's PC 20 in response to an instruction from the administrator's PC 50. In the distribution information 61, administrator information that identifies the administrator as the distribution source of the distribution information 61 is added to a header (not illustrated) or the like.

Figure 6:
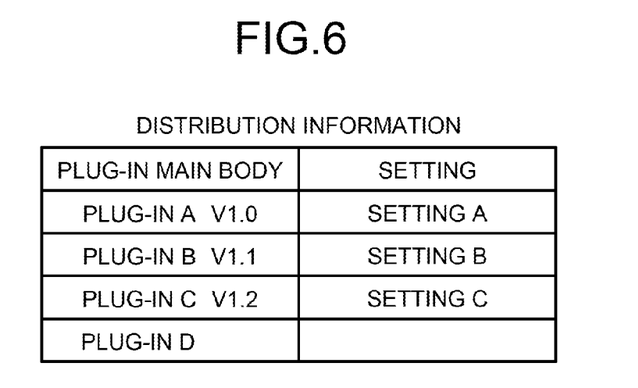
FIG. 6 is a table illustrating the configuration of distribution information transmitted by the administrator's PC.

FIG. 6 is a table illustrating the configuration of the distribution information 61 transmitted by the administrator's PC 50. As illustrated in FIG. 6, the distribution information 61 includes some pieces of information that identify the plug-in main bodies and settings (the settings A to C and the like) corresponding to the respective plug-in main bodies. Some software, such as the plug-in D, may have no setting.

Figure 7:
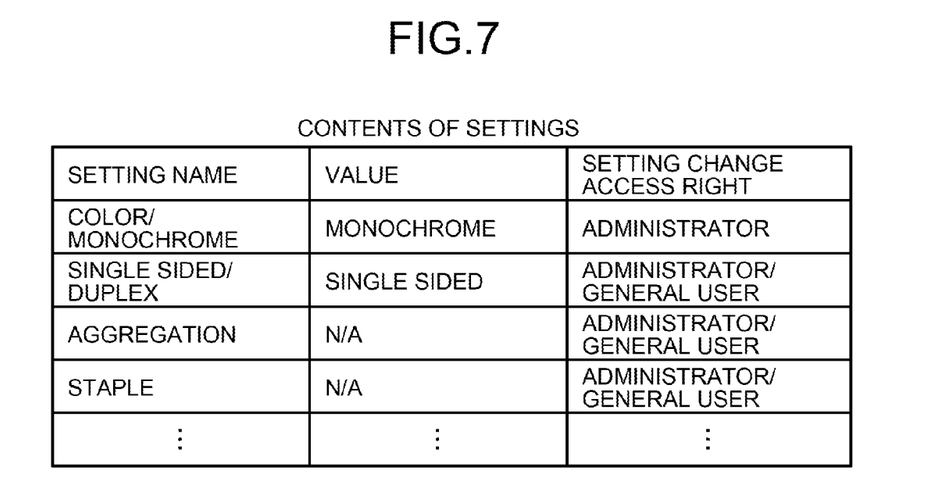
FIG. 7 is a table illustrating the contents of settings included in the distribution information illustrated in FIG. 6.

FIG. 7 is a table illustrating the contents of settings (for example, the setting A) included in the distribution information 61 illustrated in FIG. 6. As illustrated in FIG. 7, the contents of settings include a setting name showing the name of function that changes depending on settings, a value (set value), and a setting change access right as an attribute indicating whether any change in the setting (value) is permitted. For example, the value of any setting whose setting change access right is "administrator" indicates that the value is permitted to be changed only by the administrator (only from the administrator's PC 50). The value of any setting whose setting change access right is "administrator/general user" indicates that the value is permitted to be changed by both the administrator and general users (from the administrator's PC 50 and the user's PCs 20-1 and 20-2).

Figure 8:
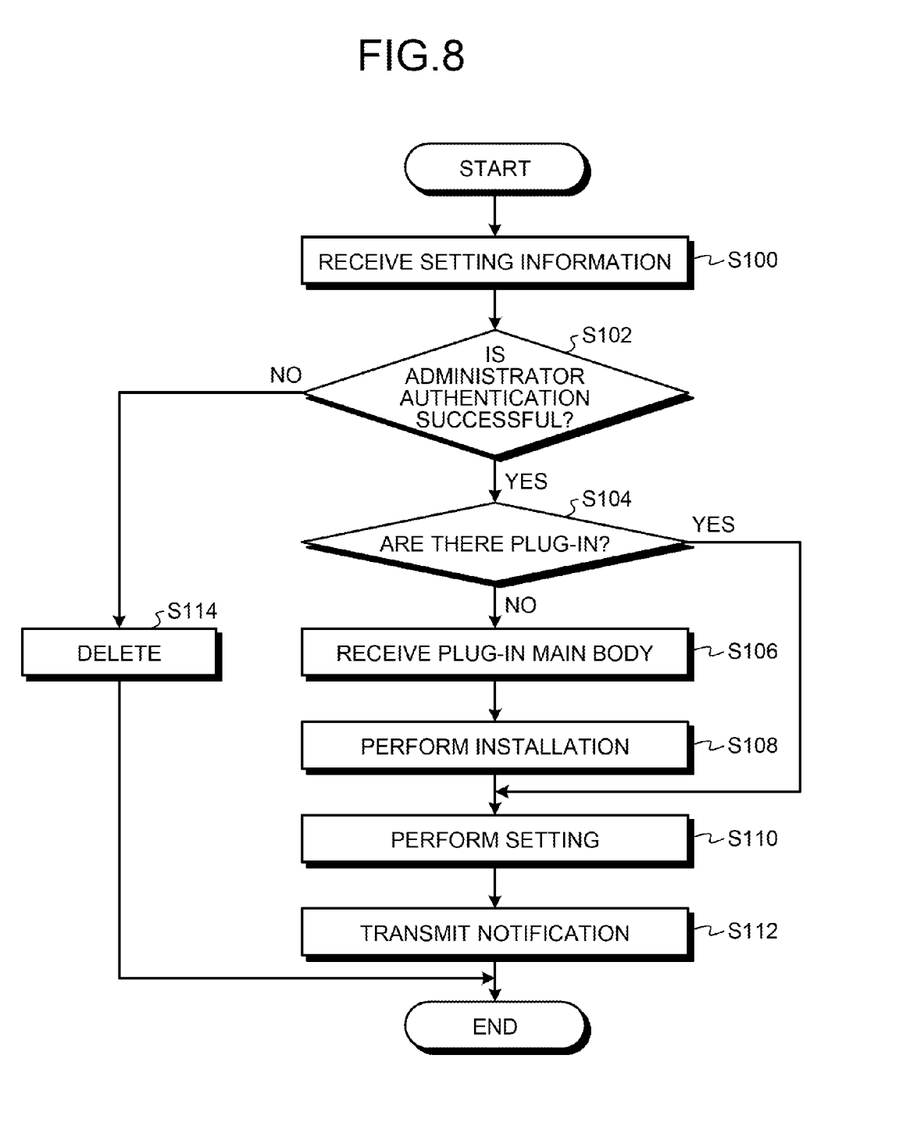
FIG. 8 is a flowchart illustrating the operation of the user's PC.

Next, the operation of the network system 10 will be described. FIG. 8 is a flowchart illustrating the operation of the user's PC 20. As illustrated in FIG. 8, at Step S100, the user's PC 20 receives the distribution information (see FIGS. 6 and 7) from the administrator's PC 50. In other words, the user's PC 20 receives the contents of settings (setting information) illustrated in FIG. 7.

At Step S102, the user's PC 20 refers to the administrator information added to, for example, the header of the distribution information illustrated in FIG. 6 to perform administrator authentication, thereby determining whether the distribution information is valid. If the administrator authentication has been performed successfully (Yes at Step S102), the process flow proceeds to the process at Step S104. If the administrator authentication has not been performed successfully (No at Step S102), the process flow proceeds to the process at Step S114.

At Step S104, the user's PC 20 determines whether it already has a plug-in indicated by the distribution information. If the user's PC 20 does not have the plug-in (No at Step S104), the process flow proceeds to the process at Step S106. If the user's PC 20 already has the plug-in (Yes at Step S104), the process flow proceeds to the process at Step S110.

At Step S106, the user's PC 20 receives the plug-in main body.

At Step S108, the user's PC 20 installs thereon the received plug-in main body. The details of the installation in the process at Step S108 will be described later using FIG. 10.

At Step S110, the user's PC 20 performs setting on the installed plug-in main body using the settings included in the distribution information.

At Step S112, the user's PC 20 transmits a notification that the setting has been completed to the administrator's PC 50.

At Step S114, the user's PC 20 deletes the received distribution information.

Figure 9:
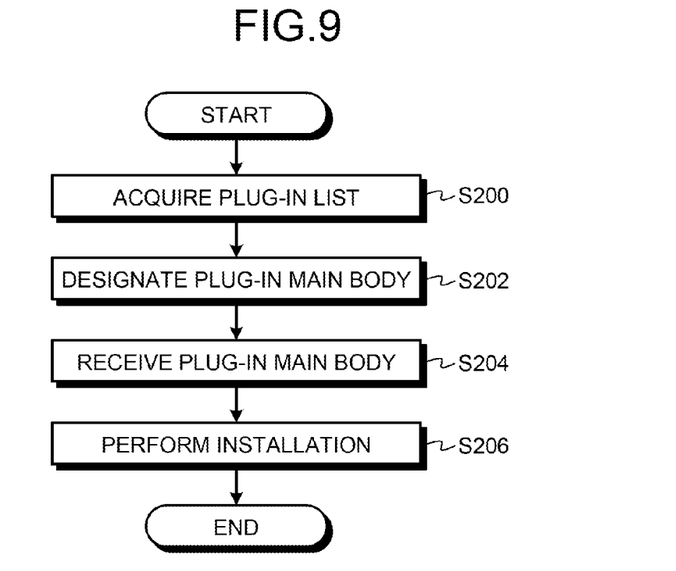
FIG. 9 is a flowchart illustrating an operation when a client according to a comparative example performs installation.

FIG. 9 is a flowchart illustrating an operation when a client according to a comparative example performs installation. As illustrated in FIG. 9, at Step S200, the client according to the comparative example acquires a plug-in list from the administrator's PC 50 or the like in response to an operation by a user.

At Step S202, the client designates a plug-in main body to be installed from the plug-in list in response to an operation of the user.

At Step S204, the client receives the designated plug-in main body.

At Step S206, the client installs thereon the received plug-in main body.

As described above, the client according to the comparative example installs thereon the plug-in main body in response to the operations of the user.

Figure 10:
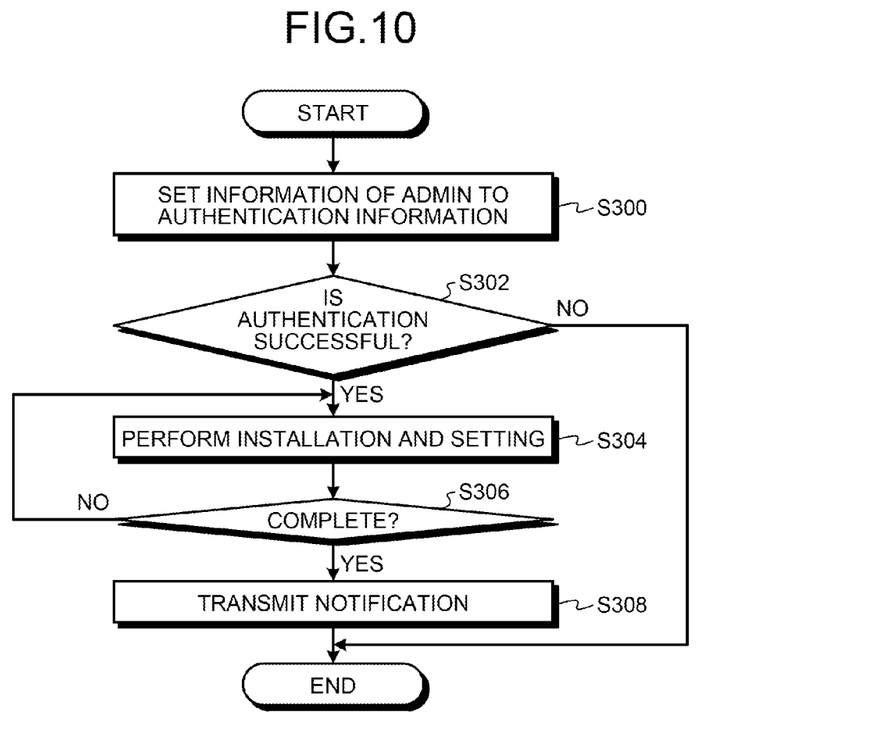
FIG. 10 is a flowchart illustrating an operation when the user's PC performs installation.

Next, the operation when the user's PC 20 performs installation (Step S108 in FIG. 8) will be described in detail. FIG. 10 is a flowchart illustrating an operation when the user's PC 20 performs installation. As illustrated in FIG. 10, at Step S300, the user's PC 20 sets the information of Admin to authentication information. As a specific example, the user's PC 20 reads authentication information indicating administrator authority for the user's PC 20 from the Admin 37 (FIG. 2) and displays a screen that is input with the authentication information in advance and asks user's approval.

At Step S302, the user's PC 20 determines whether the administrator authority has been authenticated successfully. For example, if the user's PC 20 receives the input indicating the fact that the administrator authority has been authenticated successfully (Yes at Step S302), the process flow proceeds to the process at Step S304. If the administrator authority has not been authenticated successfully (No at Step S302), the process ends.

At Step S304, the user's PC 20 performs specific installation, setting, and the like.

At Step S306, the user's PC 20 determines whether the process at Step S304 has been completed. If the user's PC 20 determines that the process at Step S304 has not been completed (No at Step S306), it allows the process at Step S304 to continue. If it determines that the process at Step S304 has been completed (Yes at Step S306), the process flow proceeds to the process at Step S308.

At Step S308, the user's PC 20 transmits, to the administrator's PC 50, a notification that the specific installation, setting, and the like has been completed.

Figure 11:
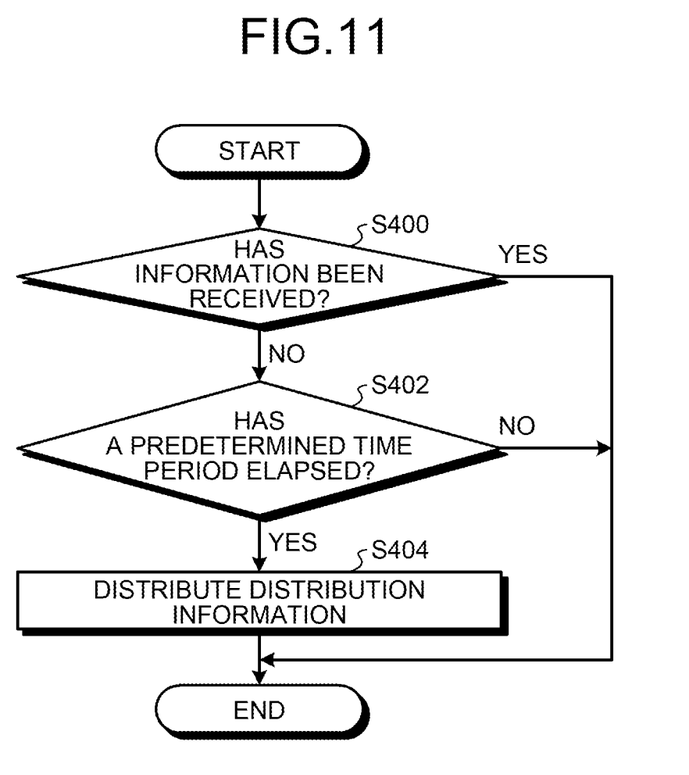
FIG. 11 is a flowchart illustrating the operation of the administrator's PC.

FIG. 11 is a flowchart illustrating the operation of the administrator's PC 50. As illustrated in FIG. 11, at Step S400, the administrator's PC 50 determines whether it has received the notification transmitted by the user's PC 20 in the process at Step S308 illustrated in FIG. 10. If the administrator's PC 50 determines that it has not received the notification (No at Step S400), the process flow proceeds to the process at Step S402. If it determines that it has received the notification (Yes at Step S400), the process ends.

At Step S402, the administrator's PC 50 determines whether a predetermined time period has elapsed. If the administrator's PC 50 determines that a predetermined time period has elapsed (Yes at Step S402), it regards that the setting or the like in the user's PC 20 has not been performed successfully and the process flow proceeds to the process at Step S404. If a predetermined time period has not elapsed (No at Step S402), the process ends.

At Step S404, the administrator's PC 50 performs the distribution (redistribution) of the distribution information. The administrator's PC 50 repeats the processes from Steps S400 to S404 with predetermined timing and distributes the distribution information again to the user's PC 20 that has not completed the installation or the setting even after the predetermined time period has elapsed, thereby prompting the installation or setting operation by the user.

Figure 12:
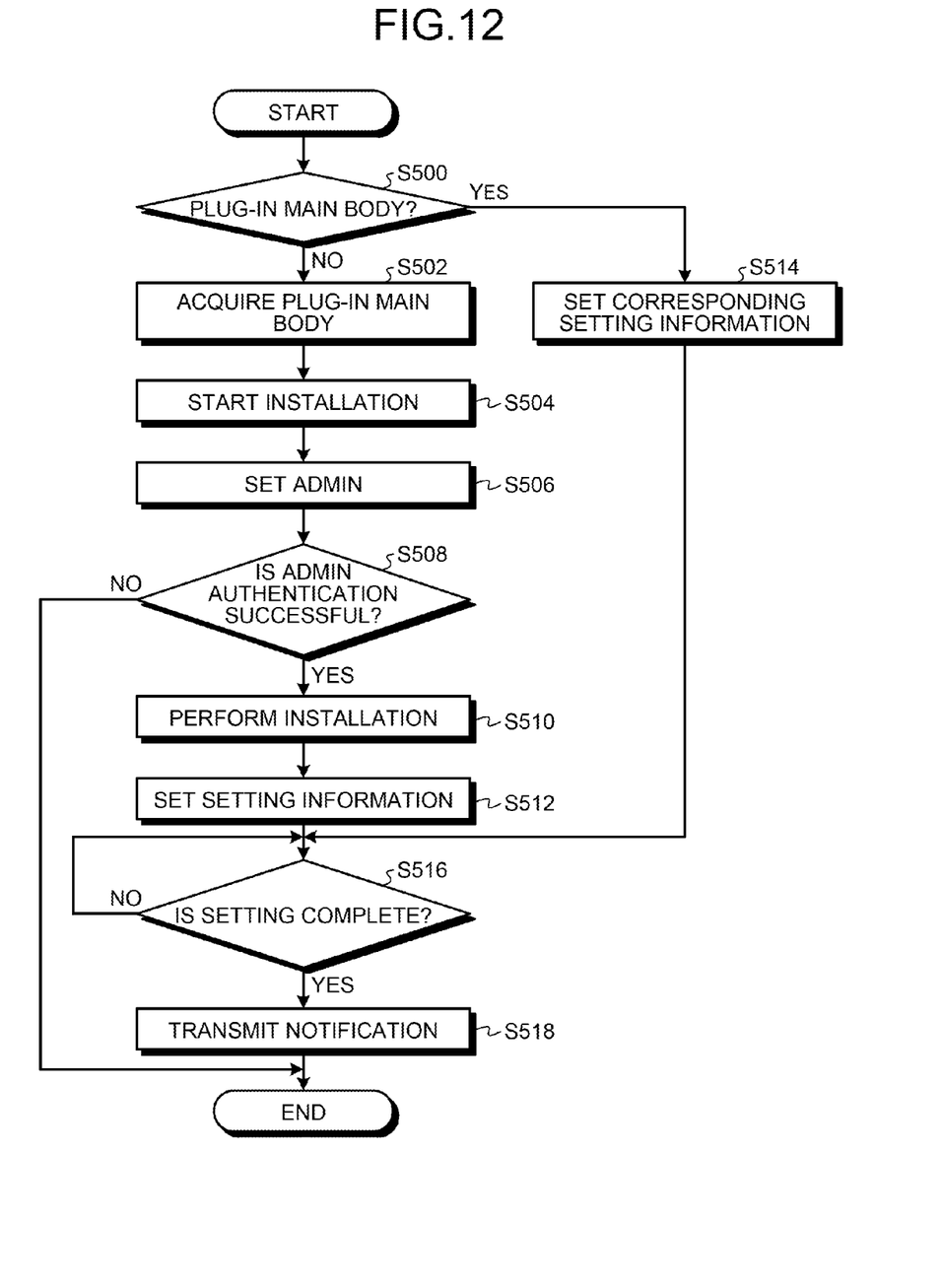
FIG. 12 is a flowchart illustrating the operation of the user's PC when the user's PC makes a request of a software managing PC for a plug-in main body.

Next, described will be the operation of the user's PC 20 when the user's PC 20 makes a request of the software managing PC 12 for a plug-in main body. FIG. 12 is a flowchart illustrating the operation of the user's PC 20 when the user's PC 20 makes a request of the software managing PC 12 for a plug-in main body. As illustrated in FIG. 12, at Step S500, the user's PC 20 determines whether it already has a plug-in main body indicated by the distribution information. If the user's PC 20 does not have a plug-in main body (No at Step S500), the process flow proceeds to the process at Step S502. If it already has the plug-in (Yes at Step S500), the process flow proceeds to the process at Step S514.

At Step S502, the user's PC 20 acquires the plug-in main body.

At Step S504, the user's PC 20 starts installation (starts the operation of an installer).

At Step S506, the user's PC 20 sets the information of Admin to authentication information. As a specific example, the user's PC 20 reads authentication information indicating administrator authority for the user's PC 20 from the Admin 37 (FIG. 2) and displays a screen that is input with the authority information in advance and asks for user's approval.

At Step S508, the user's PC 20 determines whether the administrator authority has been authenticated successfully. For example, if the user's PC 20 receives the input indicating the fact that the administrator authority has been authenticated successfully (Yes at Step S508), the process flow proceeds to the process at Step S510. If the administrator authority has not been authenticated successfully (No at Step S508), the process ends.

At Step S510, the user's PC 20 installs thereon the plug-in main body.

At Step S512, the user's PC 20 sets the contents of settings (setting information) illustrated in FIG. 7 to the plug-in main body.

At Step S514, the user's PC 20 sets the contents of settings (setting information) corresponding to the plug-in main body that the user's PC 20 already has.

At Step S516, the user's PC 20 determines whether the setting has been completed. If the setting has not been completed (No at Step S516), the user's PC 20 continues the process until the setting is completed. If the user's PC 20 determines that the setting has been completed (Yes at Step S516), the process flow proceeds to the process at Step S518.

At Step S518, the user's PC 20 transmits a notification that the setting has been completed to the administrator's PC 50.

Figure 13:
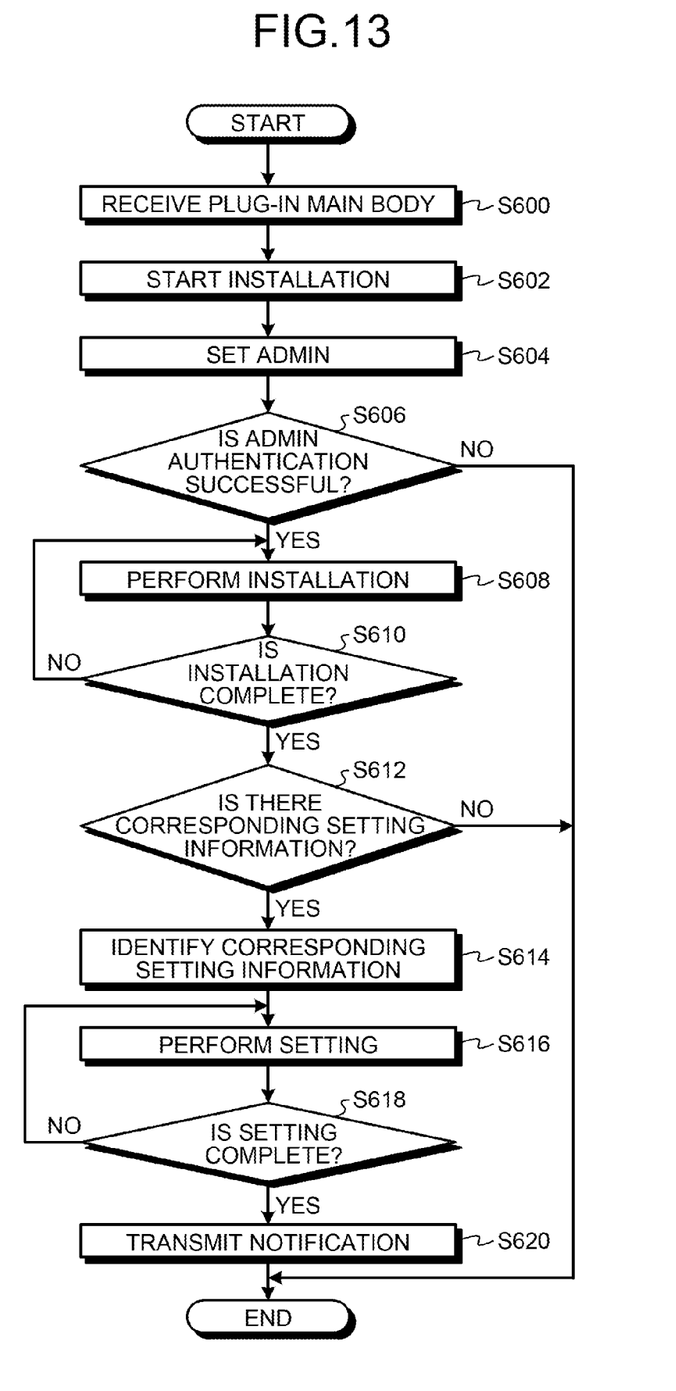
FIG. 13 is a flowchart illustrating the operation of the user's PC when the software managing PC transmits a plug-in main body to the user's PC in response to an instruction of the administrator's PC.

Next, described will be the operation of the user's PC 20 when the software managing PC 12 transmits a plug-in main body to the user's PC 20 in response to an instruction of the administrator's PC 50. FIG. 13 is a flowchart illustrating the operation of the user's PC 20 when the software managing PC 12 transmits a plug-in main body to the user's PC 20 in response to an instruction of the administrator's PC 50. As illustrated in FIG. 13, at Step S600, the user's PC 20 receives a plug-in main body transmitted by the administrator's PC 50.

At Step S602, the user's PC 20 starts installation (starts the operation of an installer).

At Step S604, the user's PC 20 sets the information of Admin to authentication information. As a specific example, the user's PC 20 reads authentication information indicating administrator authority for the user's PC 20 from the Admin 37 (FIG. 2) and displays a screen that is input with the authority information in advance and asks for user's approval.

At Step S606, the user's PC 20 determines whether the administrator authority has been authenticated successfully. For example, if the user's PC 20 receives the input indicating the fact that the administrator authority has been authenticated successfully (Yes at Step S606), the process flow proceeds to the process at Step S608. If the administrator authority has not been authenticated successfully (No at Step S606), the process ends.

At Step S608, the user's PC 20 installs thereon the plug-in main body.

At Step S610, the user's PC 20 determines whether the process at Step S608 has been completed. If the user's PC 20 determines that the process at Step S608 has not been completed (No at Step S610), it allows the process at Step S608 to continue. If it determines that the process at Step S608 has been completed (Yes at Step S610), the process flow proceeds to the process at S612.

At Step S612, the user's PC 20 determines whether there are the contents of settings (setting information) illustrated in FIG. 7 corresponding to the installed plug-in main body. If the user's PC 20 determines there is the corresponding setting information (Yes at Step S612), the process flow proceeds to the process at Step S614. If there is no corresponding setting information (No at Step S612), the process ends.

At Step S614, the user's PC 20 identifies the setting information corresponding to the installed plug-in out of a plurality of pieces of setting information.

At Step S616, the user's PC 20 sets the setting information identified in the process at Step S614 to the plug-in main body.

At Step S618, the user's PC 20 determines whether the process at Step S616 has been completed. If the user's PC 20 determines that the process at Step S616 has not been completed (No at Step S618), it allows the process at Step S616 to continue. If it determines that the process at Step S616 has been completed (Yes at Step S618), the process flow proceeds to the process at Step S620.

At Step S620, the user's PC 20 transmits a notification that the setting has been completed to the administrator's PC 50.

If the software managing PC 12 has transmitted a plurality of plug-in main bodies to the user's PC 20 in response to an instruction of the administrator's PC 50, the user's PC 20 identifies the settings corresponding to respective plug-in main bodies out of a plurality of settings, and performs the settings for each plug-in main body.

Figure 14:
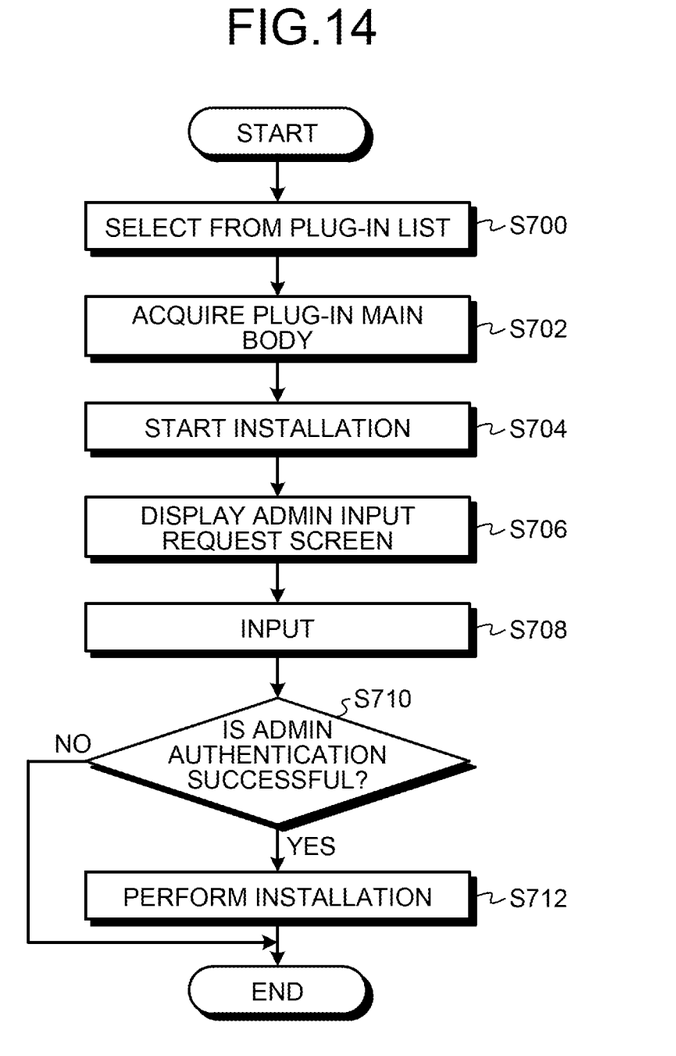
FIG. 14 is a flowchart illustrating an operation when the client according to the comparative example selects and installs thereon a plug-in main body.

FIG. 14 is a flowchart illustrating an operation when a client according to the comparative example selects and installs thereon a plug-in main body. As illustrated in FIG. 14, at Step S700, the client according to the comparative example selects a plug-in main body to be installed from a plug-in list in response to an operation of a user.

At Step S702, the client receives the plug-in main body selected in the process at Step S700.

At Step S704, the client starts installation (starts the operation of an installer).

At Step S706, the client displays a screen that makes a request of the input of Admin (administrator authority).

At Step S708, the client receives the input by the user with respect to Admin.

At Step S710, the client determines whether the administrator authority has been authenticated successfully. For example, if the client receives the input indicating the fact that the administrator authority has been authenticated successfully (Yes at Step S710), the process flow proceeds to the process at Step S712. If the administrator authority has not been authenticated successfully (No at Step S710), the process ends.

At Step S712, the client performs the installation of the plug-in main body.

As described above, because a setting for a plug-in that operates on the platform includes an attribute indicating whether any change in the setting is permitted, any change in the setting of software distributed through a network can be restricted by the administrator of the software.

The present embodiment allows the administrator to distribute information to be installed or set in a device such as a user's PC and then to manage whether the installation or setting of the information has been completed in the user's PC.

The user's PC 20, the administrator's PC 50, and the software managing PC 12 of the present embodiment include a controller such as a CPU, storage devices such as a read only memory (ROM) and a random access memory (RAM), external storage devices such as an HDD and a CD drive, a display device such as a display, and inputting devices such as a keyboard and a mouse, and have a hardware configuration using general computers. An information processing program to be executed by the user's PC 20, the administrator's PC 50, and the software managing PC 12 of the present embodiment is recorded on a computer-readable recording medium such as a CD-ROM, a flexible disk (FD), a CD-R, and a digital versatile disk (DVD) as a file in an installable form or an executable form to be provided.

The information processing program to be executed by the user's PC 20, the administrator's PC 50, and the software managing PC 12 of the present embodiment may be stored on a computer connected to a network such as the Internet and may be provided by being downloaded through the network. The information processing program to be executed by the user's PC 20, the administrator's PC 50, and the software managing PC 12 of the present embodiment may be provided or distributed through a network such as the Internet. The information processing program of the present embodiment may be incorporated into a ROM or the like in advance to be provided.

The present invention provides the effect of allowing the administrator of software to restrict any change in the settings of the software that is distributed through a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network system comprising:
a first information processing apparatus; and
a second information processing apparatus connected to the first information processing apparatus through a network, wherein
the first information processing apparatus includes,
a transmitter configured to transmit setting information for an application to the second information processing apparatus, the setting information including an attribute of a user who has a right of changing the setting information, and
the second information processing apparatus includes,
a platform on which the installed application operates;
a receiver configured to receives the setting information;
a determining unit configured to determine whether a target application on which a setting operation is to be performed based on the received setting information has been installed;
an obtaining unit configured to, when the determining unit determines that the target application has not been installed, obtain the target application through the network;
a setting performing unit configured to perform the setting operation on the target application based on the received setting information after the target application has been installed; and
a function executing unit configured to executes the installed application, a function of the application in accordance with the setting operation based on the setting information.

2. The network system according to claim 1, further comprising:
a third information processing apparatus configured to transmit the application to the second information processing apparatus through the network, wherein
the receiver is further configured to receive the application transmitted from the third information processing apparatus.

3. The network system according to claim 2, wherein
the first information processing apparatus comprises:

a data receiver configured to receive data indicating whether the second information processing apparatus has received the application, and a storage unit that stores therein the data for each application.

4. The network system according to claim 2, wherein the network system is configured such that, when a plurality of settings have been received, the function executing unit identifies, out of the settings, a setting corresponding to the received application to execute the function of the received application.

5. The network system according to claim 2, wherein the second information processing apparatus further comprises an authority information storage unit that stores therein authority information indicating administrator authority, and when receiving an input indicating the fact that the administrator authority has been authenticated successfully, the second information processing apparatus starts installation of the application based on the authority information read from the authority information storage unit.

6. An information processing method performed in the network system including a first information processing apparatus and a second information processing apparatus connected to the first information processing apparatus through a network, the method comprising:

transmitting, by the first processing apparatus, setting information for an application to the second information processing apparatus, the setting information including an attribute of a user who has a right of changing the setting information, receiving, by the second information processing apparatus, the setting information;

determining whether a target application on which a setting operation is to be performed based on the received setting information has been installed;

obtaining the target application through the network, when the determining unit determines that the target application has not been installed;

performing the setting operation on the target application based on the received setting information after the target application has been installed; and executing, on the installed application, a function of the application in accordance with the setting operation based on the setting information.

7. The information processing method according to claim 6, wherein the network system further includes a third information processing apparatus, and the method further comprises:

transmitting the application to the second information processing apparatus through the network, and receiving the application from the third information processing apparatus.

8. The information processing method according to claim 7, further comprising:

receiving, by the first information processing apparatus, data indicating whether the second information processing apparatus has received the application; and storing, by the second information processing apparatus, the data for each application in a storage unit.

9. The information processing method according to claim 7, wherein when a plurality of settings have been received, the executing includes identifying, out of the settings, a setting corresponding to the received application to execute the function of the received application.

10. The information processing method according to claim 7, further comprising:

storing, by the second information processing apparatus, authority information indicating administrator authority in a storage unit; and starting, by the second information processing apparatus, installation of the application based on the authority information read from the storage unit when receiving an input indicating the fact that the administrator authority has been authenticated successfully.

* * * * *